US011072243B2

(12) United States Patent
Nakata et al.

(10) Patent No.: US 11,072,243 B2
(45) Date of Patent: Jul. 27, 2021

(54) VEHICLE BRAKING DEVICE

(71) Applicants: ADVICS CO., LTD., Kariya (JP); TOYOTA JIDOSHA KABUSHIKI KAISHA, Toyota (JP)

(72) Inventors: Daisuke Nakata, Seto (JP); Kosuke Hashimoto, Kariya (JP); Kenji Sakamoto, Shizuoka-ken (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 16/330,781

(22) PCT Filed: Jul. 25, 2017

(86) PCT No.: PCT/JP2017/026769
§ 371 (c)(1),
(2) Date: Mar. 6, 2019

(87) PCT Pub. No.: WO2018/047487
PCT Pub. Date: Mar. 15, 2018

(65) Prior Publication Data
US 2019/0193572 A1 Jun. 27, 2019

(30) Foreign Application Priority Data

Sep. 9, 2016 (JP) .............................. JP2016-176267

(51) Int. Cl.
*B60L 7/26* (2006.01)
*B60T 8/17* (2006.01)
(Continued)

(52) U.S. Cl.
CPC ...... *B60L 7/26* (2013.01); *B60L 7/18* (2013.01); *B60L 7/24* (2013.01); *B60T 8/17* (2013.01);
(Continued)

(58) Field of Classification Search
CPC ...... B60L 7/26; B60L 7/24; B60L 7/18; B60T 13/586; B60T 8/17; B60T 2270/604
See application file for complete search history.

(56) References Cited

U.S. PATENT DOCUMENTS

2010/0270854 A1 10/2010 Okano et al.
2012/0136547 A1* 5/2012 Miyazaki .............. B60T 8/4081
701/70
(Continued)

FOREIGN PATENT DOCUMENTS

JP  2009154600 A  7/2009
JP  2014046767 A  3/2014

*Primary Examiner* — Sze-Hon Kong
(74) *Attorney, Agent, or Firm* — Buchanan Ingersoll & Rooney PC

(57) ABSTRACT

A vehicle braking device sets a target hydraulic braking force based on the difference between the execution regeneration braking force, which is actually generated regeneration braking force and the requested braking force which is to be applied to the vehicle wheels and includes a hydraulic pressure control portion that raises the target hydraulic braking force by a predetermined value at a timing when the difference between the execution regeneration braking force and the maximum value thereof is equal to or less than a judgement threshold value and a threshold value setting portion that sets the judgement threshold value on the basis of the requested braking force gradient when the liquid amount inside the hydraulic chamber is less than a predetermined amount, and sets the judgement threshold value on the basis of the target hydraulic braking force gradient when the liquid amount is equal to or more than the predetermined amount.

2 Claims, 4 Drawing Sheets

(51) Int. Cl.
*B60L 7/24* (2006.01)
*B60L 7/18* (2006.01)
*B60T 13/58* (2006.01)

(52) U.S. Cl.
CPC ....... *B60T 13/586* (2013.01); *B60T 2270/604* (2013.01)

(56) References Cited

U.S. PATENT DOCUMENTS

| | | | |
|---|---|---|---|
| 2013/0127236 A1* | 5/2013 | Hakiai | B60T 13/586 303/3 |
| 2015/0048670 A1* | 2/2015 | Nagakura | B60L 7/18 303/3 |
| 2015/0069828 A1* | 3/2015 | Ueno | B60T 13/686 303/14 |
| 2015/0217644 A1 | 8/2015 | Okano et al. | |
| 2016/0053907 A1* | 2/2016 | Isono | B60T 7/042 303/10 |

* cited by examiner

VEHICLE BRAKING DEVICE

TECHNICAL FIELD

This invention relates to a vehicle braking device.

BACKGROUND ART

For example, in the Patent Literature 1, a brake control device which performs a cooperative control of regeneration braking force and hydraulic pressure braking force has been proposed. In the Patent Literature 1, the technology is disclosed in which by detecting a timing when the regeneration braking force hits the ceiling, the hydraulic pressure braking force is raised at the detected timing.

CITATION LIST

Patent Literature

[Patent Literature 1] JP 2009-154600 A

SUMMARY OF INVENTION

Technical Problem(s)

However, according to the technology disclosed in the Patent Literature 1, by detecting the timing when the regeneration braking force hits the ceiling, the target value of the hydraulic pressure braking force (target hydraulic pressure braking force) is raised at such detected timing. Therefore, a slight time lag between the timing of detection and the timing when the hydraulic pressure braking force is actually raised is generated and due to such time lag, increasing of the vehicle deceleration is retarded, which makes the driver of the vehicle feel uncomfortable such that the brakes are not so sharp. In other words, there may be a time lag generated between the timing when the regeneration braking force (execution regeneration braking force) reaches the maximum value of the regeneration braking force of the regeneration braking device (maximum regeneration braking force) and the timing when the hydraulic pressure braking force increases.

Accordingly, this invention was made in consideration with the above-mentioned situation and the objective of the invention is to provide a vehicle braking device which can reduce an uncomfortable brake feeling given to a driver of a vehicle.

Solution to Problem(s)

The vehicle braking device associated with the invention includes a hydraulic pressure braking device which applies a hydraulic pressure braking force corresponding to a hydraulic pressure in a hydraulic pressure chamber to a wheel of a vehicle and a regeneration braking device which converts a kinetic energy of the wheel into an electric energy and applies a regeneration braking force to the wheel, wherein a target hydraulic pressure braking force which corresponds to a target value of the hydraulic pressure braking force is set based on a difference which is obtained by subtracting an execution regeneration braking force which corresponds to an actually generated regeneration braking force from a requested braking force which corresponds to a requested value of a braking force to be applied to the wheel. The vehicle braking device further includes a hydraulic pressure control portion which raises the target hydraulic pressure braking force by a predetermined value at a timing when a difference between a maximum regeneration braking force which corresponds to a maximum value of the regeneration braking force that the regeneration braking device can generate and the execution regeneration braking force becomes equal to or less than a judgement threshold value and a threshold value setting portion which sets the judgement threshold value based on a gradient of the requested braking force when a liquid amount in the hydraulic pressure chamber is less than a predetermined amount and sets the judgement threshold value based on a gradient of the target hydraulic pressure braking force when the liquid amount in the hydraulic pressure chamber is equal to or more than the predetermined amount.

Effect of Invention

According to the invention, the raising of the target hydraulic pressure braking force considering a response delay of the hydraulic pressure braking force and in response to a rising timing of the hydraulic pressure braking force can be performed and eventually an uncomfortable feeling by the driver of the vehicle can be reduced.

BRIEF EXPLANATION OF ATTACHED DRAWINGS

EMBODIMENTS FOR IMPLEMENTING INVENTION

The vehicle braking device applied to a vehicle according to an embodiment will be explained with reference to the attached drawings. The drawings show conceptual views for the purpose of explaining the embodiments of the invention.

Figure 1:
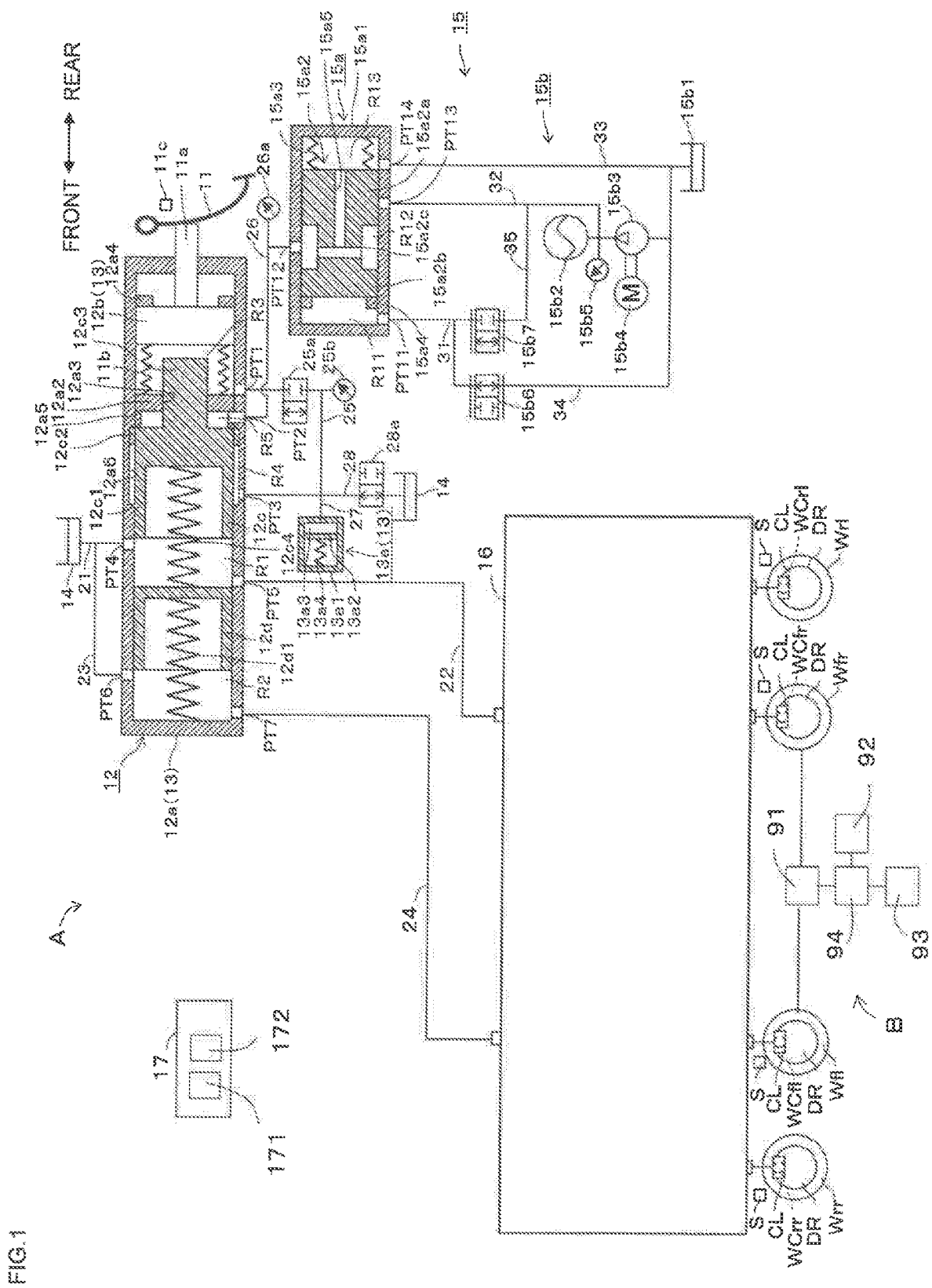
FIG. 1 is a structural view of the vehicle braking device according to an embodiment of the invention.

As shown in FIG. 1, the vehicle is equipped with a hydraulic pressure braking device A which applies hydraulic pressure braking force to each wheel Wfl, Wfr, Wrl and Wrr (also referred to collectively as vehicle wheel W, front wheel Wf, or rear wheel Wr) to brake the vehicle. Further, the vehicle according to the embodiment is a hybrid type vehicle and is equipped with a regeneration braking device B which generates a regeneration braking force at the front wheel Wf. The regeneration braking device B includes, mainly a generator 91 provided at the drive axle of the front wheel Wf, a hybrid ECU 92, a battery 93 and an inverter 94. The regeneration braking device B is a device which applies the regeneration braking force at the vehicle wheel W (here, in this embodiment, the front wheel Wf) by converting the kinetic energy of the vehicle into the electric energy. The structure of the regeneration braking device B is well-known and the detail explanation thereof is omitted.

(Hydraulic Pressure Braking Device)

The hydraulic pressure braking device A, as shown in FIG. 1, includes a brake pedal 11, a master cylinder 12, a stroke simulator portion 13, a reservoir 14, a booster mechanism 15, an actuator 16, a brake ECU 17 and a wheel cylinder (corresponding to "hydraulic pressure chamber") WCfl, WCfr, WCrl and WCrr.

The wheel cylinders WCfl, WCfr, WCrl and WCrr (also collectively referred to as "WC") respectively restrict the rotation of the vehicle wheels W and are provided at the respective calipers CL. The wheel cylinder WC functions as a braking force applying mechanism which applies braking force to the vehicle wheel W based on the pressure of brake fluid (brake hydraulic pressure) from the actuator 16. When the brake hydraulic pressure is supplied to the wheel cylinder WC, each piston (not shown) of each wheel cylinder WC pushes a pair of brake pads (not shown) which is formed by the friction member to squeeze a disc rotor DR, which corresponds to a rotational member rotating unitary with the vehicle wheel W, from both sides of the rotor DR to thereby restrict the rotation of the rotor. In this embodiment, a disc type brake system is adopted, but a drum type brake system can be adopted. As explained above, the hydraulic pressure braking device A is a device which applies the hydraulic pressure braking force corresponding to the hydraulic pressure in the wheel cylinder WC (wheel pressure) to the vehicle wheel W.

The brake pedal 11 is a brake operating member and is connected to the stroke simulator portion 13 and the master cylinder 12 via an operating rod 11a.

A stroke sensor 11c is provided in the vicinity of the brake pedal 11 for detecting a brake pedal stroke (operating amount: hereinafter, also referred to as "stroke") which is generated by the depression of the brake pedal 11 and which indicates a brake operating state. The stroke sensor 11c is connected to the brake ECU 17 to output the detection signal (detection result) to the brake ECU 17.

The master cylinder 12 supplies the brake fluid with the actuator 16 in response to the operating amount of the brake pedal 11. The master cylinder 12 is formed by a cylinder body 12a, an input piston 12b, a first master piston 12c and a second master piston 12d, etc.

The cylinder body 12a is formed in approximately the shape of a cylinder with a bottom. A partition wall portion 12a2 is provided on the inner peripheral portion of the cylinder body 12a and is projecting in an inwardly flanged shape. A through-hole 12a3 is formed at the central portion of the partition wall portion 12a2 and is penetrating therethrough in a front/rear direction. In the inner peripheral portion of the cylinder body 12a, the first master piston 12c and the second master piston 12d are liquid-tightly and movably disposed along in an axial direction at a further front side of the inner peripheral portion with respect to the partition wall portion 12a2.

In the inner peripheral portion of the cylinder body 12a, an input piston 12b is liquid-tightly and movably disposed along in an axial direction at a further rear side of the inner peripheral portion with respect to the partition wall portion 12a2. The input piston 12b is a piston which slidably moves within the cylinder body 12a in response to the operation of the brake pedal 11.

The input piston 12b is connected to the operating rod 11a which moves in association with the movement of the brake pedal 11. The input piston 12b is biased by a compression spring 11b in a direction where the volume of the first hydraulic pressure chamber R3 is expanded, i.e., in a rearward direction (right direction as viewed in the drawing). When the brake pedal 11 is depressed, the input piston 12b advances, overcoming the biasing force of the compression spring 11b. Accompanied by the advance movement of the operating rod 11a, the input piston 12b also advances in association with the movement of the operating rod 11a. It is noted that when the depression operation of the brake pedal 11 is released, the input piston 12b retreats by the biasing force of the compression spring 11b until it contacts with a restriction projecting portion 12a4 and is positioned thereby.

The first master piston 12c is formed in order from the front side by a pressurizing cylindrical portion 12c1, a flange portion 12c2 and a projecting portion 12c3 as a unit. The pressurizing cylindrical portion 12c1 is formed in approximately the shape of a bottomed cylinder with an opening at the front side and is liquid-tightly and slidably movably disposed in the cylinder body 12a relative to the inner peripheral surface thereof. A coil spring 12c4, which is a biasing member, is disposed in an inner space of the pressurizing cylindrical portion 12c1 between the second master piston 12d and the inner space of the pressurizing cylindrical portion 12c1. The first master piston 12c is biased in a rearward direction by the coil spring 12c4. In other words, the first master piston 12c is biased in a rearward direction by the coil spring 12c4 and eventually is brought into contact with the restriction projecting portion 12a5 to be positioned thereby. This position of the first master piston 12c is defined as the initial position (predetermined in advance) under a state that the depression operation of the brake pedal 11 has been released.

The flange portion 12c2 is formed such that the diameter thereof is formed larger than the diameter of the pressurizing cylindrical portion 12c1 and is disposed in an inner peripheral surface of a large diameter portion 12a6 of the cylinder body 12a to liquid-tightly and at the same time slidably move within the inner peripheral surface thereof. The projecting portion 12c3 is formed such that a diameter thereof is formed smaller than the diameter of the pressurizing cylindrical portion 12c1 and is arranged to be liquid-tightly and slidably move through the through-hole 12a3 of the partition wall portion 12a2. The rear end portion of the projecting portion 12c3 projects into an inner space of the cylinder body 12a, passing through the through-hole 12a3 and is separated from the inner peripheral surface of the cylinder body 12a. The rear end surface of the projecting portion 12c3 is separated from the bottom surface of the input piston 12b and is formed such that the separated distance therebetween is variable.

The second master piston 12d is arranged in the cylinder body 12a at the front side of the first master piston 12c. The second master piston 12d is formed in approximately the shape of a bottomed cylinder with an opening at the front side. A coil spring 12d1, which is a biasing member, is disposed in the inner space of the second master piston 12d between the second master piston 12d and the inner bottom surface of the cylinder body 12a. The second master piston 12d is biased in a rearward direction by the coil spring 12d1. In other words, the second master piston 12d is biased towards the set initial position by the coil spring 12d1.

Further, in the master cylinder 12, a first master chamber R1, a second master chamber R2, a first hydraulic pressure chamber R3, a second hydraulic pressure chamber R4 and a servo chamber R5 are formed. In the explanation, the first master chamber R1 and the second master chamber R2 may be referred to collectively as "the master chamber R1, R2". The first master chamber R1 is defined by the inner peripheral surface of the cylinder body 12a, the first master piston 12c (front side of the pressurizing cylindrical portion 12c1) and the second master piston 12d. The first master chamber R1 is connected to the reservoir 14 via a conduit 21 which is connected to the port PT4. Further, the first master chamber R1 is connected to the actuator 16 via a conduit 22 which is connected to the port PT5.

The second master chamber R2 is defined by the inner peripheral surface of the cylinder body 12a and the front side of the second master piston 12d. The second master chamber R2 is connected to the reservoir 14 via a conduit 23 which is connected to the port PT6. Further, the second master chamber R2 is connected to the actuator 16 via a conduit 24 which is connected to the port PT7.

The first hydraulic pressure chamber R3 is formed between the partition wall portion 12a2 and the input piston 12b and is defined by the inner peripheral surface of the cylinder body 12a, the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the inner peripheral surface of the large diameter portion 12a6 of the cylinder body 12a, the pressurizing cylindrical portion 12c1 and the flange portion 12c2. The first hydraulic pressure chamber R3 is connected to the second hydraulic pressure chamber R4 via a conduit 25 which is connected to the port PT1 and the port PT3.

The servo chamber R5 is formed between the partition wall portion 12a2 and the pressurizing cylindrical portion 12c1 of the first master piston 12c and is defined by the inner peripheral surface of the cylinder body 12a, the partition wall portion 12a2, the projecting portion 12c3 of the first master piston 12c and the pressurizing cylindrical portion 12c1. The servo chamber R5 is connected to the output chamber R12 via a conduit 26 which is connected to the port PT2.

The pressure sensor 26a is a sensor which detects the servo pressure supplied to the servo chamber R5 and is connected to the conduit 26. The pressure sensor 26a sends the detection signal (detection result) to the brake ECU 17. The servo pressure detected at the pressure sensor 26a is the actual value of the hydraulic pressure in the servo chamber R5 and hereinafter, referred to as an actual servo pressure (actual hydraulic pressure).

The stroke simulator portion 13 includes the cylinder body 12a, the input piston 12b, the first hydraulic pressure chamber R3 and the stroke simulator 13a which is connected to the first hydraulic pressure chamber R3.
The first hydraulic pressure chamber R3 is connected to the stroke simulator 13a via the conduits 25 and 27 which are connected to the port PT1. It is noted that the first hydraulic pressure chamber R3 is connected to the reservoir 14 via a connecting hydraulic passage (not shown).

The stroke simulator 13a generates a stroke (reaction force) on the brake pedal 11, which magnitude depends on the operating state of the brake pedal 11. The stroke simulator 13 includes a cylindrical portion 13a1, a piston portion 13a2, a reaction force hydraulic pressure chamber 13a3 and a spring 13a4. The piston portion 13a2 liquid-tightly slidably moves in the cylindrical portion 13a1 in response to the braking operation of the brake pedal 11. The reaction force hydraulic pressure chamber 13a3 is formed between the cylindrical portion 13a1 and the piston portion 13a2. The reaction force hydraulic pressure chamber 13a3 is connected to the first hydraulic pressure chamber R3 and the second hydraulic pressure chamber R4 via the conduits 27 and 25, respectively. The spring 13a4 biases the piston portion 13a2 in a direction where the volume of the reaction force hydraulic pressure chamber 13a3 decreases.

It is noted that in the conduit 25, a first electromagnetic valve 25a which is a normally closed type electromagnetic valve is disposed. A second electromagnetic valve 28a which is a normally open type electromagnetic valve is disposed in the conduit 28 which connects the conduit 25 and the reservoir 14. When the first electromagnetic valve 25a is in a closed state, the communication between the first and the second hydraulic pressure chambers R3 and R4 is interrupted. Under such state, the input piston 12b and the first master piston 12c are moved maintaining a predetermined distance therebetween. Further, when the first electromagnetic valve 25a is in an open state, the communication between the first and the second hydraulic pressure chambers R3 and R4 is established. Under this state, the volume change of the first and the second hydraulic pressure chambers R3 and R4 caused by the advance/retreat movement of the first master piston 12c can be absorbed by the transfer of the brake fluid therebetween.

The pressure sensor 25b is a sensor which detects the reaction force hydraulic pressure in the second hydraulic pressure chamber R4 and the first hydraulic pressure chamber R3 and is connected to the conduit 25. The pressure sensor 25b serves also as an operation force sensor which detects the operation force applied to the brake pedal 11 and has a mutual relationship with the operating amount of the brake pedal 11. The pressure sensor 25b detects the pressure in the second hydraulic pressure chamber R4 when the first electromagnetic valve 25a is in the closed state and detects also the pressure (or the reaction force hydraulic pressure) of the connected first hydraulic pressure chamber R3 when the first electromagnetic valve 25a is in the open state. The pressure sensor 25b sends the detection signal (detection result) to the brake ECU 17.

The booster mechanism 15 mainly generates the servo pressure in response to the operating amount of the brake pedal 11. The booster mechanism 15 is a hydraulic pressure generating device which outputs the output pressure (servo pressure according to the embodiment) by the operation of the input pressure (pilot pressure according to the embodiment) wherein the reaction delay of the output pressure relative to the input pressure at the starting time of pressure increasing operation or pressure decreasing operation occurs when the output pressure is intended to be increased or decreased. The booster mechanism 15 includes a regulator 15a and the pressure supply device 15b.

The regulator 15a includes the cylinder body 15a1 and a spool 15a2 which slidably moves within the cylinder body 15a1. In the regulator 15a, a pilot chamber R11, an output chamber R12 and a third hydraulic pressure chamber R13 are formed.

The pilot chamber R11 is defined by the cylinder body 15a1 and the front end surface of the second large diameter portion 15a2b of the spool 15a2. The pilot chamber R11 is connected to the pressure decreasing valve 15b6 and the pressure increasing valve 15b7 (to the conduit 31) which are connected to the port PT11. A restriction projecting portion 15a4 is provided at an inner peripheral surface of the cylinder body 15a1 for positioning the spool 15a2 by contacting with the front end surface of the second large diameter portion 15a2b of the spool 15a2.

The output chamber R12 is defined by the cylinder body 15a1, a small diameter portion 15a2c of the spool 15a2, a rear end surface of the second large diameter portion 15a2b and the front end surface of the first large diameter portion 15a2a. The output chamber R12 is connected to the servo chamber R5 of the master cylinder 12 via the conduit 26 which is connected to the port PT12 and the port PT2. Further, the output chamber R12 is connectible with the accumulator 15b2 via the conduit 32 which is connected to the port PT 13.

The third hydraulic pressure chamber R13 is defined by the cylinder body 15a1 and the rear end surface of the first large diameter portion 15a2a of the spool 15a2. Further, the third hydraulic pressure chamber R13 is connectible with the reservoir 15b1 via the conduit 33 which is connected to the port PT 14. A spring 15a3 is disposed in the third hydraulic pressure chamber R13 which biases the spool 15a2 in a direction where the volume of the third hydraulic pressure chamber R13 is expanded.

The spool 15a2 includes the first large diameter portion 15a2a, the second large diameter portion 15a2b and the small diameter portion 15a2c. The first and the second large diameter portions 15a2a and 15a2b are formed such that they liquid-tightly slidably move within the cylinder body 15a1. The small diameter portion 15a2c is provided between the first and the second large diameter portions 15a2a and 15a2b and is formed integrally with the first and the second large diameter portions 15a2a and 15a2b. The diameter of the small diameter portion 15a2c is formed to be smaller than the diameters of the first and the second large diameter portions 15a2a and 15a2b.

A communication passage 15a5 is provided in the spool 15a2 to hydraulically connect the output chamber R12 and the third hydraulic pressure chamber R13.

The pressure supply device 15b serves also as a driving portion which drives the spool 15a2. The pressure supply device 15b includes a reservoir 15b1 which is a low pressure source, an accumulator 15b2 which is a high pressure source and which accumulates the brake fluid therein, a pump 15b3 which pumps-in the brake fluid from the reservoir 15b1 and pumps-out the brake fluid to the accumulator 15b2 and an electric motor 15b4 which drives the pump 15b3. The reservoir 15b1 is exposed to the atmosphere and the hydraulic pressure in the reservoir 15b1 is the same level with the atmospheric pressure. The hydraulic pressure in the low pressure source is lower than the hydraulic pressure in the high pressure source. The pressure supply device 15b includes the pressure sensor 15b5 which detects the pressure of the brake fluid supplied from the accumulator 15b2 and outputs the detection result to the brake ECU 17.

Further, the pressure supply device 15b includes the pressure decreasing valve 15b6 and the pressure increasing valve 15b7. In detail, the pressure decreasing valve 15b6 is a normally open type structure electromagnetic valve which opens under the non-energized state. The flow-rate of the pressure decreasing valve 15b6 is controlled by the instructions from the brake ECU 17. One side of the pressure decreasing valve 15b6 is connected to the pilot chamber R11 via the conduit 31 and the other side thereof is connected the reservoir 15b1 via the conduits 34. The pressure increasing valve 15b7 is a normally closed type structure electromagnetic valve which closes under the non-energized state. The flow-rate of the pressure increasing valve 15b7 is controlled by the instructions from the brake ECU 17. One side of the pressure increasing valve 15b7 is connected to the pilot chamber R11 via the conduit 31 and the other side thereof is connected the accumulator 15b2 via the conduit 35 and the conduit 32 which is connected to the conduit 35.

The operation of the regulator 15a will be briefly explained hereinafter. When the pilot pressure (hydraulic pressure in the pilot chamber R11) is not supplied to the pilot chamber R11 from any of the pressure decreasing valve 15b6 and the pressure increasing valve 15b7, the spool 15a2 is biased by the biasing force of the spring 15a3 to hold the initial position (See FIG. 1). The initial position of the spool 15a2 is the position where the front-end surface of the spool 15a2 is in contact with the restriction projecting portion 15a4 and the position is fixed. This position corresponds to a position immediately before the rear end surface of the spool 15a2 closes the port PT14.

Thus, when the spool 15a2 is positioned at the initial position, the port PT14 and the port PT12 are in communication with each other through the communication passage 15a5 and at the same time the port PT13 is closed by the spool 15a2.

When the pilot pressure, which is established in response to the operating amount of the brake pedal 11 by the pressure decreasing valve 15b6 and the pressure increasing valve 15b7, is increased, the spool 15a2 moves rearward (right side as viewed in FIG. 1), overcoming the biasing force of the spring 15a3. The spool 15a2 moves up to a position where the port PT13 which has been closed by the spool 15a2 is opened. The port PT14 which has been in an open state, now closes by the movement of the spool 152a2. This state of the spool 15a2 is defined to be the "pressure increasing position". Under this state, the port PT13 and the port PT12 are in fluid communication with each other via the output chamber R12.

Further, the pushing force of the spool 15a2 to the front end surface of the second large diameter portion 15a2b and a resultant force of the force corresponding to the servo pressure and the biasing force of the spring 15a3 are balanced to thereby fix the position of the spool 15a2. This fixed position of the spool 15a2 is defined as the "holding position". Under this holding position, the port PT13 and the port PT14 are closed by the spool 15a2.

Further, when the pilot pressure which is established in response to the operating amount of the brake pedal 11 is decreased by the pressure decreasing valve 15b6 and the pressure increasing valve 15b7, the spool 15a2 at the holding position moves frontward by the biasing force of the spring 15a3. Then, the port PT13, which has been closed by the spool 15a2, keeps the holding state. Further, the port PT14, which has been closed, now opens. The position of the spool 15a2 under this state is defined to be the "pressure decreasing position". The port PT14 and the port PT12 under this state are in fluid communication with each other via the communication passage 15a5.

The booster mechanism 15 as explained above establishes the pilot pressure in response to the stroke of the brake pedal 11 by the pressure decreasing valve 15b6 and the pressure increasing valve 15b7 and the servo pressure in response to the stroke of the brake pedal 11 is generated by the pilot pressure. Thus generated servo pressure is supplied to the servo chamber R5 of the master cylinder 12 and then the master cylinder 12 supplies the wheel cylinder WC with the master pressure generated in response to the stroke of the brake pedal 11. The pressure decreasing valve 15b6 and the pressure increasing valve 15b7 form a valve portion which adjusts the brake fluid flowing into or out of the servo chamber R5.

The actuator 16 is a device which adjusts the upstream pressure (master pressure) and supplies the downstream side (wheel cylinder WC) with the adjusted upstream pressure. The actuator 16 includes a plurality of electromagnetic valves, electric pump and reservoir (all are not shown). The actuator 16 executes the pressure increasing control, the pressure decreasing control and the holding control for the wheel cylinder WC based on the master pressure. In the pressure increasing control, the master chamber R1, R2 and the wheel cylinder WC are in fluid communication and the master pressure is supplied to the wheel cylinder WC. In the pressure decreasing control, the wheel cylinder WC and the reservoir (atmospheric pressure) are in fluid communication. In the holding control, the wheel cylinder WC is in a sealed state. The actuator 16 has two conduit systems for the four wheel cylinders WC and connects the wheel cylinders WC and the master chambers R1, R2 through a so-called X-conduit system or a front/rear conduit system. The actuator 16 forms the ABS (Anti-lock Brake System) to execute an ABS control (also called antiskid control). The structure of the actuator 16 is well-known and the detail explanation thereof will be omitted. It is noted here that, in addition to the ABS control, the actuator 16 may be configured to be able to execute an automatic pressurizing control and a skid prevention control.

(Raising)

The brake ECU 17 and the hybrid ECU 92 are in the form of electronic control unit and each includes CPU (Central Processing Unit) and memories. Although not shown in the drawings, the brake ECU 17 is connected to the booster mechanism 15 and the actuator 16 to be able to give instructions thereto. The brake ECU 17 (and the hybrid ECU 92) executes a cooperative control for the regeneration braking device B and the hydraulic pressure braking device A so that the sum of the regeneration braking force and the hydraulic pressure braking force may follow the requested braking force. The requested braking force corresponds to a requested value of the braking force to be applied to the vehicle wheels W.

The brake ECU 17 includes a hydraulic pressure control portion 171 and a threshold value setting portion 172 as a function. The hydraulic pressure control portion 171 executes a control of the hydraulic pressure braking force, i.e., a control of the servo pressure (pressure increasing control, the pressure decreasing control, or the holding control) based on the target hydraulic pressure braking force obtained by calculation from the requested braking force. The requested braking force corresponds to the braking force to be applied to the vehicle wheel W (total braking force) in response to the braking operation by the driver of the vehicle. The hydraulic pressure control portion 171 is, for example, based on the map or the like, determines the requested braking force in response to the operation to the brake pedal 11 (stroke and/or depression force).

The hydraulic pressure control portion 171 sends the requested braking force to the hybrid ECU 92 as the "target regeneration braking force". The hybrid ECU 92 exerts the regeneration braking force that is equal to or less than the target regeneration braking force and that is the maximum value of the regeneration braking force that can be outputted upon requesting situation. The hybrid ECU 92 sends the "execution regeneration braking force" which is the regeneration braking force actually generated to the brake ECU 17. The execution regeneration braking force depends on the vehicle speed (vehicle wheel speed) and the state of battery 93. The hydraulic pressure control portion 171 controls the booster mechanism 15 and/or the actuator 16 based on a difference (deficiency of braking force) in braking force which is obtained by subtracting the execution regeneration braking force from the requested braking force as the "target hydraulic pressure braking force". The target hydraulic pressure braking force is a target value of the hydraulic pressure braking force.

In more detail, the hydraulic pressure control portion 171 determines the target servo pressure based on the target hydraulic pressure braking force. The hydraulic pressure control portion 171 controls the pressure decreasing valve 15b6 and the pressure increasing valve 15b7 so that the actual servo pressure approximates the target servo pressure. A dead zone is provided in the target servo pressure. The dead zone is an area of the pressure from the dead zone lower limit value which pressure is lower than the target servo pressure to the dead zone upper limit value which pressure is higher than the target servo pressure. When the value of the actual servo pressure is within the dead zone area, the holding control is executed and when the value of the actual servo pressure is lower than the dead zone lower limit value, the pressure increasing control is executed. When the value of the actual servo pressure is higher than the dead zone upper limit value, the pressure decreasing control is executed.

The hydraulic pressure control portion 171 raises the target hydraulic pressure braking force by a predetermined value at the time when the difference between the "maximum regeneration braking force" which is the maximum value of the regeneration braking force that the regeneration braking device B can generate and the execution regeneration braking force becomes equal to or less than a judgement threshold value. In other words, the hydraulic pressure control portion 171 calculates the difference between the maximum regeneration braking force and the execution regeneration braking force and when the calculated difference becomes equal to or less than the judgement threshold value, a predetermined value is added to the target hydraulic pressure braking force. In detail, the hydraulic pressure control portion 171 raises the target servo pressure by a predetermined pressure (hereinafter, this raising is referred to also as "raising processing"), when the difference between the maximum regeneration braking force and the execution regeneration braking force becomes equal to or less than the judgement threshold value. It is noted here that raising the target hydraulic pressure braking force by a predetermined value is included in the concept of raising the target servo pressure (or the target wheel pressure) by a predetermined pressure.

The threshold value setting portion 172 sets the judgement threshold value based on the gradient of the requested braking force when the liquid amount in the wheel cylinder WC is less than a predetermined amount and sets the judgement threshold value based on the gradient of the target hydraulic pressure braking force when the liquid amount in the wheel cylinder WC is equal to or more than the predetermined amount. The threshold value setting portion 172 according to the embodiment judges whether or not the liquid amount in the wheel cylinder WC is less than the predetermined amount based on the judgement whether or not the difference between the requested braking force and the execution regeneration braking force (i.e., the target hydraulic pressure braking force) is equal to or less than the predetermined threshold value. In other words, the threshold value setting portion 172 judges that the liquid amount in the wheel cylinder WC is less than the predetermined amount when the target hydraulic pressure braking force is equal to or less than the predetermined threshold value and judges that the liquid amount in the wheel cylinder WC is equal to or more than the predetermined amount when the target hydraulic pressure braking force is more than the predetermined threshold value. The hydraulic pressure braking force is co-related with the wheel pressure and based on the target hydraulic pressure braking force, the magnitude of the liquid amount in the wheel cylinder WC can be judged. The predetermined threshold value may be set to be zero, for example. The threshold value setting portion 172 according to the embodiment executes the judgement every predetermined time interval and sets the judgement threshold value per every execution of the judgement. The threshold value setting portion 172 obtains each gradient information from the hydraulic pressure control portion 171.

The threshold value setting portion 172 sets the judgement threshold value such that the smaller the gradient of the requested braking force, the larger the judgement threshold value is set when the liquid amount in the wheel cylinder WC is less than the predetermined amount and sets the judgement threshold value such that the smaller the gradient of the target hydraulic pressure braking force, the larger the judgement threshold value is set when the liquid amount in the wheel cylinder WC is equal to or more than the predetermined amount. In other words, according to the embodiment, the threshold value setting portion 172 sets the judgement threshold value such that the smaller the gradient of the requested braking force or the gradient of the target hydraulic pressure braking force, the larger the judgement threshold value is set. It may be said that threshold value setting portion 172 sets the judgement threshold value such that the larger the gradient of the requested braking force, the smaller the judgement threshold value is set when the liquid amount in the wheel cylinder WC is less than the predetermined amount and sets the judgement threshold value such that the larger the gradient of the target hydraulic pressure braking force, the smaller the judgement threshold value is set when the liquid amount in the wheel cylinder WC is equal to or more than the predetermined amount.

Figure 2:
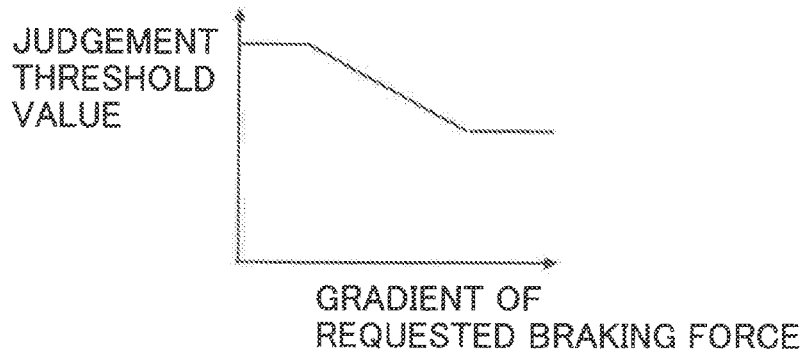
FIG. 2 is an explanatory diagram explaining a relationship between the judgement threshold value and a gradient of the requested braking force according to the embodiment.
Figure 3:
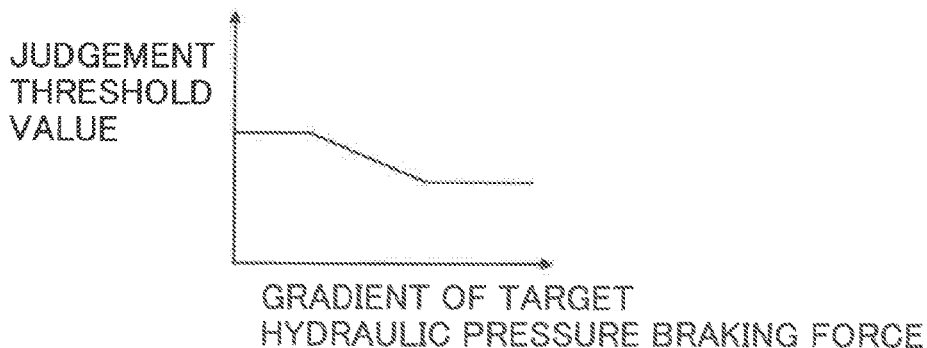
FIG. 3 is an explanatory diagram explaining a relationship between the judgement threshold value and a gradient of the target hydraulic pressure braking force according to the embodiment.

In the threshold value setting portion 172 according to the embodiment, as shown in FIG. 2, the relationship (first relationship) between the gradient of the requested braking force and the judgement threshold value is set and as shown in FIG. 3, the relationship (second relationship) between the gradient of the target hydraulic pressure braking force and the judgement threshold value is set. The maps (first map and second map) showing the relationships illustrated in FIGS. 2 and 3 are memorized in the threshold value setting portion 172. The relationships according to the embodiment between the gradients and the judgement threshold value are set to be a stepped linear relationship with a gradient between the steps as shown in FIGS. 2 and 3. According to the stepped liner relationship, the change ratio of the judgement threshold value relative to the change of the gradient of the first relationship is larger than that of the second relationship. It is noted that the first and the second relationships may be the function (linear, quadric, etc.), stepped relationship or any combined relationship.

The raising according to the embodiment will be explained hereinafter with a detail example. In the case shown in FIG. 4, the brake pedal 11 is depressed and the requested braking force is increasing and under this situation, the execution regeneration braking force is increasing, satisfying the requested braking force. In other words, in this case, the target hydraulic pressure braking force keeps zero until the execution regeneration braking force reaches the maximum regeneration braking force. Accordingly, during this time, the threshold value setting portion 172 continues to judge that the "liquid amount in the wheel cylinder WC is less than the predetermined amount". Accompanied by this judgement, based on the first relationship, the threshold value setting portion 172 continues to set the judgement threshold value in response to the gradient of the requested braking force. At the time Ta1, when the difference between the maximum regeneration braking force and the execution regeneration braking force becomes equal to or less than the set judgement threshold value, the hydraulic pressure control portion 171 executes the raising processing and the target servo pressure becomes increased by a predetermined pressure from the zero value. Then, at the time Ta2, the execution regeneration braking force reaches the maximum regeneration braking force and thereafter, the target hydraulic pressure braking force increases in response to the increase of the requested braking force and the target servo pressure rises from the predetermined pressure (raising amount).

Figure 4:
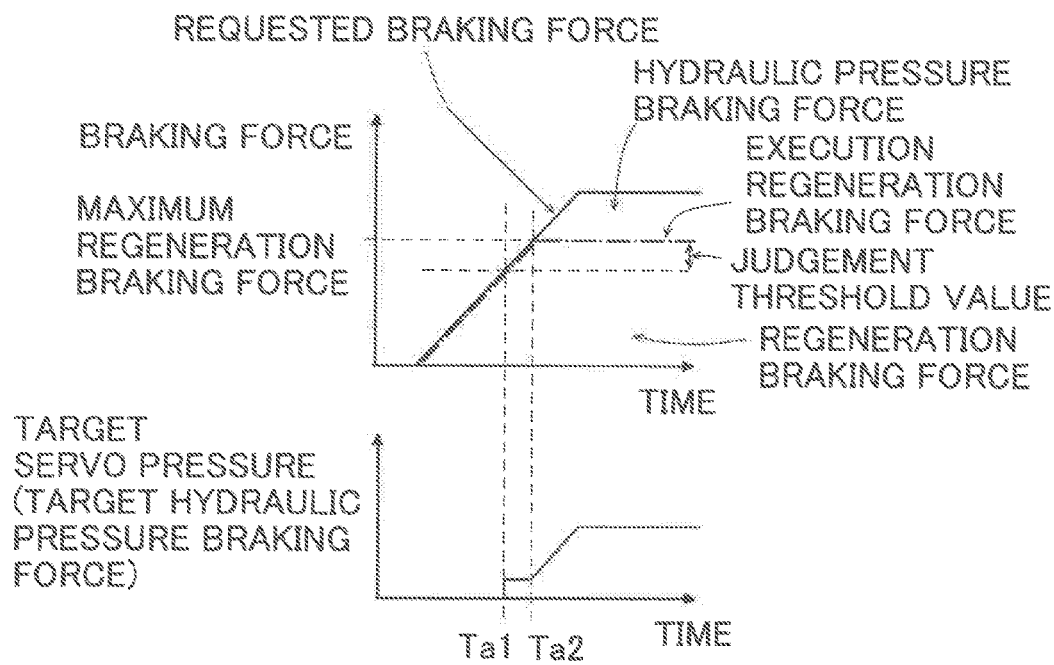
FIG. 4 is a time chart explaining a raising processing according to the embodiment.

Hereinafter, setting of the judgement threshold value will be explained assuming that the gradient of the requested braking force shown in FIG. 4 is positioned at the center of the linear portion in the first relationship and that the liquid amount in the wheel cylinder WC is less than the predetermined amount. Under this condition, for example, when the gradient of the requested braking force is larger than the gradient shown in FIG. 4, the judgement threshold value becomes smaller than the value shown in FIG. 4 and when the difference between the maximum regeneration braking force and the execution regeneration braking force becomes small, i.e., at a time later than the time Ta1, the raising processing is executed. Oppositely, under the same condition, for example, when the gradient of the requested braking force is smaller than the value shown in FIG. 4, the judgement threshold value becomes larger than the value shown in FIG. 4 and when the difference between the maximum regeneration braking force and the execution regeneration braking force becomes large, i.e., at a time earlier than the time Ta1, the raising processing is executed.

Figure 5:
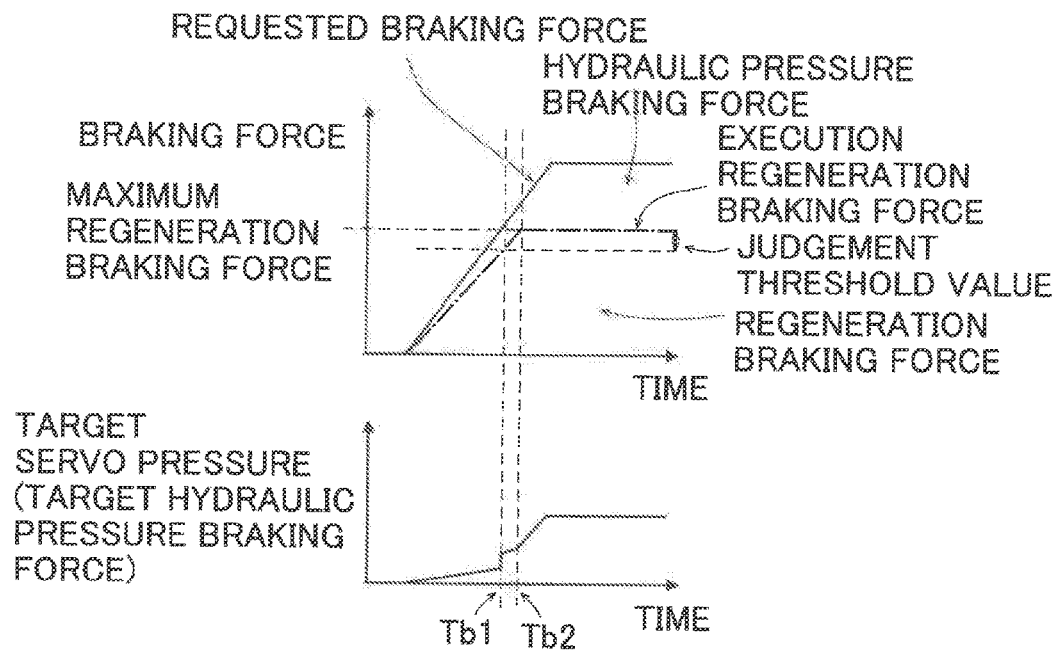
FIG. 5 is a time chart explaining a raising processing according to the embodiment.

On the other hand, in the case shown in FIG. 5, the brake pedal 11 is depressed and the requested braking force is increasing under the state that requested braking force is larger than the execution regeneration braking force. In other words, in such state, the target hydraulic pressure braking force has been increasing before the execution of the raising processing so that the wheel pressure is about to be generated. Accordingly, after the target hydraulic pressure braking force becomes equal to or more than the predetermined threshold value, i.e., in this embodiment (predetermined threshold value is set to be zero), after the hydraulic pressure braking force is generated, the threshold value setting portion 172 continues to judge that the "liquid amount in the wheel cylinder WC is equal to or more than the predetermined amount". Accompanied by this judgement, based on the second relationship, the threshold value setting portion 172 continues to set the judgement threshold value in response to the gradient of the target hydraulic pressure braking force. At the time Tb1, when the difference between the maximum regeneration braking force and the execution regeneration braking force becomes equal to or less than the set judgement threshold value, the hydraulic pressure control portion 171 executes the raising processing and the target servo pressure becomes increased by the predetermined pressure (or the second predetermined pressure). Then, at the time Tb2, the execution regeneration braking force reaches the maximum regeneration braking force and thereafter, the target hydraulic pressure braking force increases in response to the increase of the requested braking force and the target servo pressure rises.

Hereinafter, setting of the judgement threshold value will be explained assuming that the gradient of the target hydraulic pressure braking force shown in FIG. 5 is positioned at the center of the linear portion in the second relationship and that the liquid amount in the wheel cylinder WC is equal to or more than the predetermined amount. Under this condition, for example, when the gradient of the target hydraulic pressure braking force is larger than the gradient shown in FIG. 5, the judgement threshold value becomes smaller than the value shown in FIG. 5 and when the difference between the maximum regeneration braking force and the execution regeneration braking force becomes small, i.e., at a time later than the time Tb1, the raising processing is executed. Oppositely, under the same condition, for example, when the gradient of the target hydraulic pressure braking force is smaller than the gradient shown in FIG. 5, the judgement threshold value becomes larger than the value shown in FIG. 5 and when the difference between the maximum regeneration braking force and the execution regeneration braking force becomes large, i.e., at a time earlier than the time Tb1, the raising processing is executed.

Figure 6:
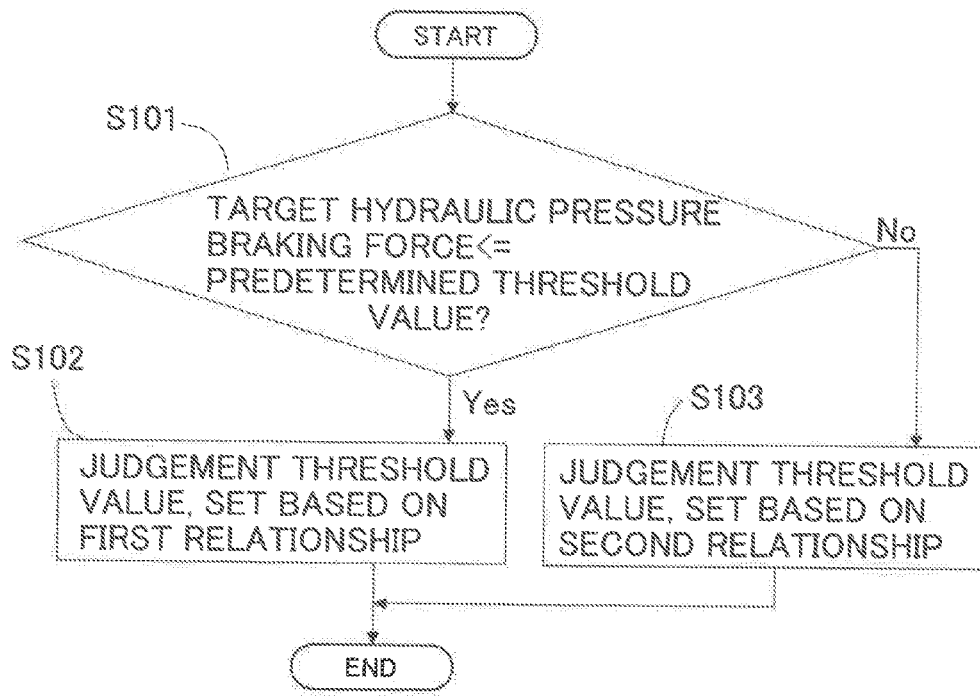
FIG. 6 is a flowchart explaining a flow of setting the judgement threshold value according to the embodiment.

The flow of the setting of the judgement threshold value according to the embodiment will be explained hereinafter. As shown in FIG. 6, the threshold value setting portion 172 judges whether or not the target hydraulic pressure braking force is equal to or less than the predetermined threshold value (S101). When the target hydraulic pressure braking force is judged to be equal to or less than the predetermined threshold value (S101: Yes), the threshold value setting portion 172 judges that the liquid amount in the wheel cylinder WC is less than the predetermined amount and sets the judgement threshold value based on the first relationship (first map) (S102). Oppositely when the target hydraulic pressure braking force is judged to be larger than the predetermined threshold value (S101: No), the threshold value setting portion 172 judges that the liquid amount in the wheel cylinder WC is equal to or more than the predetermined amount and sets the judgement threshold value based on the second relationship (second map) (S103).

Figure 7:
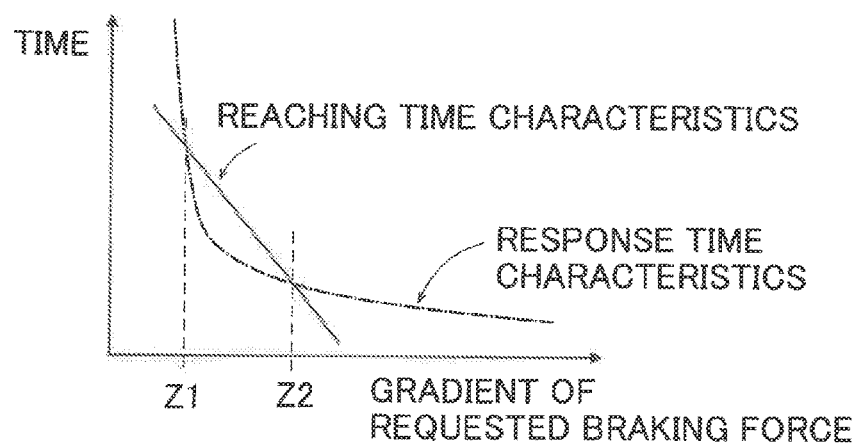
FIG. 7 is an explanatory diagram explaining various time performance characteristics.

As shown by the dash-dotted line in FIG. 7, the response time (vertical axis) of the hydraulic pressure (wheel pressure) relative to the increase of the target servo pressure has a non-linear relationship with the gradient of the requested braking force (gradient of the target hydraulic pressure braking force after the execution regeneration braking force reached the maximum regeneration braking force) (horizontal axis). Hereinafter this relationship is referred to as "response time characteristics". On the other hand, when the judgement threshold value is constant, as shown by the solid line in FIG. 7, the time until the execution regeneration braking force reaches the maximum regeneration braking force (vertical axis) is in a linear relationship with the gradient of the requested braking force (horizontal axis). Hereinafter, this relationship is referred to as "reaching time characteristics". Accordingly, except when the required braking force gradient is Z1 or Z2, the timing when the hydraulic pressure reacts (rises) and the timing when the execution regeneration braking force reaches the maximum regeneration braking force do not match. Considering this situation based on the hydraulic pressure, for example, in the area where the gradient of the target servo pressure is positioned in an area less than Z1 or larger than Z2, the rising of the hydraulic pressure is delayed and a feeling of stagnation in deceleration is generated. Oppositely, in the area where the gradient of the target servo pressure is positioned in an area larger than Z1 and less than Z2, the hydraulic pressure is firstly generated which leads to excessive generation of deceleration.

To this situation, according to the embodiment, the judgement threshold value is set in response to the liquid amount in the wheel cylinder WC based on the gradient of the requested braking force or the gradient of the target hydraulic pressure braking force. Therefore, for example, as shown by the broken arrow line in FIG. 8, linearity of the reaching time characteristics and the non-linearity (quadric function) of the response time characteristics can be approximated. In detail, by setting the judgement threshold value depending on the situation, a smaller gradient area of the response time characteristics (left side in FIG. 8) can be approximated towards the reaching time characteristics side (bending downward) and a larger gradient area of the reaching time characteristics (right side in FIG. 8) can be approximated towards the response time characteristics side (bending upward). This phenomenon can be realized for example, by setting the judgement threshold value such that the smaller the gradient, the larger the judgement threshold value is set as explained in the embodiment. By approximating the linearity of the reaching time characteristics and the non-linearity of the response time characteristics, the timing when the hydraulic pressure rises and the timing when the execution regeneration braking force reaches the maximum regeneration braking force can be easily matched.

According to the embodiment, the setting standard of the judgement threshold value can be switched over between the gradient of the requested braking force (first relationship) and the gradient of the target hydraulic pressure braking force (second relationship) in response to the "liquid amount in the wheel cylinder WC" to thereby execute the raising processing considering the situation. This principle will be explained hereinafter. First, under the condition that the feed-back control of the hydraulic pressure braking force uses a dead zone, the smaller the gradient of the target hydraulic pressure braking force, the larger the delay of the change of the actual hydraulic pressure (in this embodiment, corresponding to the "actual servo pressure") relative to the change of the target hydraulic pressure braking force becomes. This is derived from the fact that the smaller the gradient of the target hydraulic pressure, the longer the time until the actual hydraulic pressure becomes the value outside the dead zone takes.

In this situation, when the gradient of the requested braking force is fixed or constant, if the hydraulic pressure braking force has been generated before the execution regeneration braking force reached the maximum regeneration braking force (See FIG. 5), the gradient of the target hydraulic pressure braking force after the timing when the target hydraulic braking force rises (corresponding to the time Tb2 in FIG. 5; hereinafter referred to as "target rising timing") after the execution regeneration braking force reached the maximum regeneration braking force is set to be smaller as the gradient of the target hydraulic pressure braking force before the target rising timing is small. Accordingly, it can be said that the smaller the gradient of the "target hydraulic pressure braking force" before the target rising timing, the slower the rising of the actual servo pressure becomes due to the influence by the existence of the dead zone.

Further, as stated above, when the hydraulic pressure braking force has been generated before the execution regeneration braking force reached the maximum regeneration braking force (See FIG. 5), the execution regeneration braking force outputs the maximum value on a moment-tomoment basis. Accordingly, under a condition that the target hydraulic pressure braking force is being generated, the magnitude of gradient of the requested hydraulic pressure braking force is considered substantially not to influence on the gradient of the execution regeneration braking force. In other words, under this condition, the change of timing of target rising depending on the magnitude of the requested braking force can be removed from this consideration. Thus, it is preferable to execute the rising processing at an earlier timing by setting the judgement threshold value such that the smaller the gradient of the target hydraulic pressure braking force, the larger the judgement threshold value becomes, when the liquid amount in the wheel cylinder WC is equal to or more than the predetermined amount.

According to the embodiment, based on thus confirmed findings, the second relationship used when the liquid amount in the wheel cylinder WC is equal to or more than the predetermined amount is set such that the smaller the gradient of the target hydraulic pressure braking force, the larger the judgement threshold value becomes as shown in FIG. 3.

On the other hand, when the requested braking force is fully allotted to the execution regeneration braking force (See FIG. 4), the gradient of the target hydraulic pressure braking force before the target rising timing (corresponding to the time Ta2 in FIG. 4) becomes zero. Under such situation, the gradient of the target hydraulic pressure braking force after the target rising timing becomes small as the gradient of the target hydraulic pressure braking force before the target rising timing becomes small. Accordingly, as the first confirmed findings, it is considered that the smaller the gradient of the "requested braking force" before the target rising timing, the slower the rising of the actual servo pressure becomes by the influence of the existence of the dead zone. If based on only the first confirmed findings, it may be preferable to set the judgement threshold value such that the smaller the gradient of the requested braking force, the larger the judgement threshold value is set.

Further, when the requested braking force is fully allotted to the execution regeneration braking force (See FIG. 4), the timing when the execution regeneration braking force reaches the maximum regeneration braking force, i.e., the target rising timing is changeable depending on the gradient of the requested braking force before the target rising timing. For example, the larger the gradient of the requested braking force, the shorter the time from the generation of the execution regeneration braking force until the execution regeneration braking force reaches the maximum regeneration braking force becomes and by such shortening of the time, the target rising timing comes earlier. Accordingly, as the second confirmed findings, it is considered that the larger the gradient of the "requested braking force" before the target rising timing, the earlier the target rising timing comes and the rising of the actual servo pressure relatively comes slower.

If based on only the second confirmed findings, it may be preferable to set the judgement threshold value such that the smaller the gradient of the requested braking force, the smaller the judgement threshold value is set. Also, if based on only the second confirmed findings, for example, it may be considered that the judgement threshold value may be set to the value "the gradient of the requested braking force× ΔT" in order to perform raising at a timing earlier by the time ΔT relative to the target rising timing.

However, to this, the first relationship according to the embodiment is set to the relationship (stepped relationship) as shown in FIG. 2, considering both of the first and the confirmed second findings. In the embodiment, the first relationship used when the liquid amount in the wheel cylinder WC is less than the predetermined amount is set such that the smaller the gradient of the requested braking force, the larger the judgement threshold value is set.

As explained above, the main factor of time lag between the target rising timing and the timing when the hydraulic pressure braking force is increasing is that when the liquid amount in the wheel cylinder WC is less than the predetermined amount, either one of "the fluctuation of the change timing of the actual servo pressure due to the difference in magnitude of the gradient of the requested braking force" and "the fluctuation of the target rising timing due to the difference in magnitude of the gradient of the requested braking force" and that when the liquid amount in the wheel cylinder WC is equal to or more than the predetermined amount, "the fluctuation of the change timing of the actual servo pressure due to the difference in magnitude of the gradient of the target hydraulic pressure braking force". Accordingly, by changing the setting standard of the judgement threshold value in response to the liquid amount in the wheel cylinder WC, the time lag between both timings can be reduced or eliminated accurately. In other words, according to the embodiment, an uncomfortable feeling given to the driver of the vehicle due to the time lag between the timings can be reduced.

Figure 8:
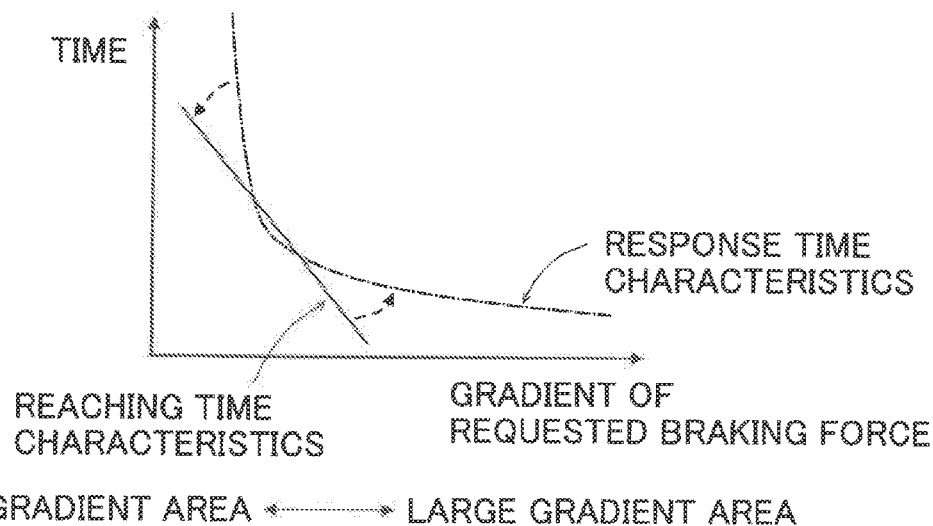
FIG. 8 is an explanatory diagram explaining a modified example of various time performance characteristics according to the embodiment.

Further, in the embodiment, it is not necessary to control the increasing gradient of the execution regeneration braking force (target regeneration braking force) to be small, before the execution regeneration braking force reaches the maximum regeneration braking force for the purpose of elimination of uncomfortable feeling in deceleration (stepped thrust feeling) in order to match both timings by changing the judgement threshold value. The controlling to limit the regeneration braking force at an earlier stage may be effective in suppressing the uncomfortable feeling in deceleration. However, as to the fuel consumption, there is a room for improvements. To this, in the embodiment, even any control for limiting the regeneration braking force is not performed, both timings can be approximated by changing the judgement threshold value, thereby to be able to exert maximum regeneration braking force. Thus, both improvements in fuel efficiency and brake feeling can be achievable. It is noted here that in this embodiment, as stated above, control for limiting the gradient of the regeneration braking force may be performed. In such case, the smaller gradient area of the reaching time characteristics indicated in FIG. 8 is approximated to the response time characteristics side.

(Others)

The invention is not limited to the embodiment explained above and for example, the first relationship may be set such that the larger the gradient of the requested braking force, the larger the judgement threshold value is set. Further, the first relationship may be set per gradient of the requested braking force (for example, per small gradient area, middle gradient area and large gradient area) considering which of the first and the second confirmed findings is given priority. Still further, the threshold value setting portion 172 may measure the wheel pressure or the servo pressure by the pressure sensor and may judge the liquid amount in the wheel cylinder WC. Further, the "hydraulic pressure chamber" is not limited to the wheel cylinder WC, and the servo chamber R5 may be used for the "hydraulic pressure chamber". Further, in the description above, the definition of "braking force" includes the concept of "brake torque", for example, controlling of braking force includes the controlling of brake torque. The raising amount in the raising processing (predetermined value, predetermined value) is not limited to the constant or fixed amount and changing amount accompanied by the elapsed time (for example, constant until a predetermined time passed and then gradually decreased after the predetermined time passed). This invention is applicable to an autonomous driving system.

REFERENCE SIGNS LIST

11; brake pedal, 12; master cylinder, 12c; first master piston, 12d; second master piston, 15; booster mechanism, 16; actuator, 17; brake ECU, 171; hydraulic pressure control portion, 172; threshold value setting portion, 91; generator, 92; hybrid ECU, 93; battery, 94; inverter, A; hydraulic pressure braking device, B; regeneration braking device, R1; first master chamber, R2; second master chamber, R5; servo chamber, W; vehicle wheel, WC; wheel cylinder.

The invention claimed is:

1. A vehicle braking device comprising:
   a hydraulic pressure braking device which applies a hydraulic pressure braking force corresponding to a hydraulic pressure in a hydraulic pressure chamber to a wheel of a vehicle; and
   a regeneration braking device which converts a kinetic energy of the wheel into an electric energy and applies a regeneration braking force to the wheel, wherein
   a target hydraulic pressure braking force which corresponds to a target value of the hydraulic pressure braking force is set based on a difference which is obtained by subtracting an execution regeneration braking force which corresponds to an actually generated regeneration braking force from a requested braking force which corresponds to a requested value of a braking force to be applied to the wheel, and wherein the vehicle braking device further includes:
   a hydraulic pressure control portion which raises the target hydraulic pressure braking force by a predetermined value at a timing when a difference between a maximum regeneration braking force which corresponds to a maximum value of the regeneration braking force that the regeneration braking device can generate and the execution regeneration braking force becomes equal to or less than a judgement threshold value; and
   a threshold value setting portion which sets the judgement threshold value based on a gradient of the requested braking force when a liquid amount in the hydraulic pressure chamber is less than a predetermined amount and sets the judgement threshold value based on a gradient of the target hydraulic pressure braking force when the liquid amount in the hydraulic pressure chamber is equal to or more than the predetermined amount.

2. The vehicle braking device according to claim 1, wherein
   the threshold value setting portion sets the judgement threshold value such that the smaller the gradient of the target hydraulic pressure braking force, the larger the judgement threshold value becomes when the liquid amount in the hydraulic pressure chamber is equal to or more than the predetermined amount.

\* \* \* \* \*